(12) United States Patent
Iwamoto (10) Patent No.: US 8,248,419 B2
(45) Date of Patent: Aug. 21, 2012

(54) GENERATION OF CUBIC BEZIER CONTROL POINTS IN COMPUTER GRAPHICS SYSTEMS

(75) Inventor: Tatsuya Iwamoto, Foster City, CA (US)

(73) Assignee: Sony Corporation Entertainment Inc.

( * ) Notice: Subject to any disclaimer, the term of this patent is extended or adjusted under 35 U.S.C. 154(b) by 742 days.

(21) Appl. No.: 12/427,524

(22) Filed: Apr. 21, 2009

(65) Prior Publication Data

US 2010/0265255 A1    Oct. 21, 2010

(51) Int. Cl.
*G06T 11/20* (2006.01)
(52) U.S. Cl. ...................................................... 345/442
(58) Field of Classification Search .................. 345/422, 345/442
See application file for complete search history.

(56) References Cited

U.S. PATENT DOCUMENTS

| | | | |
|---|---|---|---|
| 6,295,072 B1 | 9/2001 | Pon et al. | |
| 6,304,677 B1 * | 10/2001 | Schuster | 382/264 |
| 6,549,205 B1 | 4/2003 | Horii et al. | |
| 6,856,312 B1 | 2/2005 | Imai et al. | |
| 2005/0073529 A1* | 4/2005 | Gu | 345/589 |
| 2006/0044305 A1 | 3/2006 | Katka | |
| 2007/0115289 A1* | 5/2007 | Goldfarb | 345/473 |

FOREIGN PATENT DOCUMENTS

| | | |
|---|---|---|
| EP | 0 393 680 A2 | 10/1990 |
| GB | 2 406 028 A | 3/2005 |
| JP | 07-085302 | 3/1995 |
| JP | 2007-287114 | 1/2007 |

OTHER PUBLICATIONS

Lowther et al. "DesignMentor: A Pedagogical Tool for Computer Graphics and Computer-Aided Design", http://web.archive.org/web/20060831071631/http://www.cs.mtu.edu/~shene/NSF-2/iticse00-poster-dm.pdf.*
"Quadratic Bezier, 3-point interpolation", http://algorithmist.wordpress.com/2007/07/20/quadratic-bezier-3-point-interpolation, posted on Jul. 20, 2007.*
Sanchez-Reyes, "Curves with rational chord-length parameterization", available online at www.sciencedirect.com, Dec. 14, 2007.*
Subrahmonia, J. et al: "Pen computing challenges and applications," Pattern Recognition, 2000, Proceedgins, 15th International Conference on Sep. 3-7, 2000 [Proceedings of the International Conference on Pattern Recognition (ICPR)], Los Alamitos, CA, USA, IEEE Comput. Soc. US, vol. 2, Sep. 3, 2000, pp. 60-66, XP01533761, DOI:DOI:10,1109/ICPR.2000.906018, ISBN: 978-0-7695-0750-7.
J. Armstrong, "Cubic Bezier Curves,"; URL:http://www.algorithmist.net/bezier3.html; Jan. 1, 2005; Section "3-Point Interpolation with a Quadratic Bezier"; p. 5-p. 6; XP002593424.

* cited by examiner

*Primary Examiner* — Tize Ma
*Assistant Examiner* — Yingchun He
(74) *Attorney, Agent, or Firm* — Steptoe & Johnson LLP (57) ABSTRACT

A system for interactive computer graphics enables generation of Bezier curves from a series of points based on the relative position of successive points in the series. For example, for successive points in a series, point A, point B, and point C are successive points in the series of points, and wherein a control point corresponding to point B and associated with the segment AB is determined by the equation $B+R_A*(R_A*(B-C)+R_C*(A-B))$, and a control point corresponding to point B and associated with the segment BC is determined by the equation $P_{BBC}=B+R_C*(R_A*(C-B)+R_C*(B-A))$, where $R_A=|AB|/(|AB|+|BC|)$, and $R_C=|BC|/(|AB|+|BC|)$.

3 Claims, 6 Drawing Sheets

FIG. 1A

|AB| = 2.24
|BC| = 2.82
|AB| + |BC| = 5.06
$R_A$ = |AB| / (|AB|+|BC|) = 2.24 / 5.06 = 0.44
$R_C$ = |BC| / (|AB|+|BC|) = 2.82 / 5.06 = 0.56

GENERATION OF CUBIC BEZIER CONTROL POINTS IN COMPUTER GRAPHICS SYSTEMS

TECHNICAL FIELD

Briefly, and in general terms, this disclosure relates to a computer-implemented method and apparatus for computer graphics, and, more particularly, to the generation of cubic Bezier control points from a series of points in a computer graphics system.

BACKGROUND

A Bezier curve is a parametric curve used in computer graphics systems to model curves. A cubic Bezier curve from point $P_0$ to point $P_3$ is defined by those points, along with two control points $P_1$ and $P_2$. The tangent of the curve at point $P_0$ is in the direction of control point $P_1$ and the tangent of the curve at point $P_3$ is in the direction of point $P_2$. The curve is defined by the following parametric equation:

$$B(t)=(1-t)^3 P_0 + 3(1-t)^2 t P_1 + 3(1-t)t^2 P_2 + t^3 P_3,$$

for t, such that $0 \leq t \leq 1$.

Some interactive computer graphics applications enable a user to define a Bezier curve by using a mouse. The user can click and hold the mouse button to identify a point $P_0$ and then drag the mouse while still holding the button to point to the desired location of control point $P_1$. When the user releases the mouse button, the current pointer location becomes control point $P_1$. This process continues to define points $P_3$ (by pointing to the desired location, clicking, and holding) and $P_2$ (by dragging the mouse to the desired location, and releasing the mouse button). In this manner, a user may define a Bezier curve.

Furthermore, some interactive computer graphics applications enable a user to manipulate a defined Bezier curve by clicking and dragging points $P_0$ and $P_3$, as well as control points $P_1$ and $P_2$. In this manner, a user may refine curves to achieve the desired shapes. However, the click-and-drag approach to point and control point identification is largely dissimilar to freehand drawing, and may be cumbersome to some, dampening creativity.

SUMMARY

In general, there is disclosed a system for interactive computer graphics enabling generation of Bezier curves from a series of points. The system include means for data logic processing, input means for receiving user input, and a computer-readable medium. A series of points is received by the input means and is transferred to the computer-readable medium for processing by the means for data logic processing. The means for data logic processing retrieves points of the series of points from the computer-readable medium and calculates control points corresponding to one or more points according to the relative distance between successive points of the series. The means for data processing generates a Bezier curve using the calculated control points and the series of points and stores the generated Bezier curve in the computer-readable medium.

In some implementations, control points are calculated from successive points in the series, point A, point B, and point C, as follows: (i) a control point corresponding to point B and associated with the segment AB is determined by the equation B+RA*(RA*(B−C)+RC*(A−B)); and (ii) a control point corresponding to point B and associated with the segment BC is determined by the equation PBBC=B+RC*(RA*(C−B)+RC*(B−A)). For purposes of this calculation, RA=|AB|/(|AB|+|BC|), and RC=|BC|/(|AB|+|BC|).

This technique provides an improved method for defining Bezier curves in computer graphics applications. For example, the input means may be implemented as a computer keyboard, a computer pointing device (e.g., a mouse), and the like. In some implementations, a user points and clicks using a mouse to define successive points in the series, and the resulting series of points are transformed into a Bezier curve according to the relative positions of successive points in the series. Generated Bezier curves may be stored, for example, in a computer-readable medium for further processing and/or display.

Also, generally disclosed is a method for defining Bezier curves in a graphical user interface of an interactive computer graphics system including receiving a first point A, a second point B, and a third point C, each identified by a user through the graphical user interface of the interactive computer graphics system. The system is configured to calculate a control point corresponding to point B and associated with the segment AB using the equation $B+R_A^*(R_A^*(B-C)+R_C^*(A-B))$, wherein $R_A=|AB|/(|AB|+|BC|)$, and $R_C=|BC|/(|AB|+|BC|)$, and to calculate a control point corresponding to point B and associated with the segment BC using the equation $B+R_C^*(R_A^*(C-B)+R_C^*(B-A))$. The system is further configured to generate a Bezier curve data structure storing point A, point B, and point C, and storing, associated with point B, the first control point and the second control point associated with point B. The Bezier curve data structure defines a curve that may be rendered for display by the computer graphics system and manipulated by a user.

Also, generally disclosed is a system that includes means for data logic processing, a computer-readable medium, and an input device that receives path data and stores the path data on the computer-readable medium. A series of points is identified from the path data and stored on the computer-readable medium for processing by the means for data logic processing. The means for data logic processing retrieves points of the identified series of points from the computer-readable medium and calculates control points corresponding to one or more points according to the relative distance between successive points of the identified series of points. The means for data processing generates a Bezier curve using the calculated control points and the identified series of points, and the generated Bezier curve is stored in the computer-readable medium. The series of points may be identified from the path data, for example, according to a predetermined interval, which may be distance-based, time-based, feature-based, and the like. The input device may receive path data in any manner, including, for example, through a user input device such as a mouse, touch screen, or the like, or through a computer-readable medium, such as, a memory, a storage device, a network interface, and the like.

The details of one or more implementations are set forth in the accompanying drawings and the description below. Other features and advantages will be apparent from the description drawings, and the claims.

DETAILED DESCRIPTION

Referring to FIGS. 1A through 1E, this specification sets forth various techniques for generating a Bezier curve from a series of points. These techniques may be used, for example, in an interactive computer graphics application (e.g., vector-based computer drawing tools, computer-aided design tools, visualization tools, computer animation tools, graphic design tools, and the like). A user may insert a Bezier curve in a document of an interactive computer graphics application using an improved graphical user interface by simply pointing and clicking to define successive points in a series of points on the desired Bezier curve. The series of points is transformed into a Bezier curve, for example, (i) as each successive point is entered, or (ii) after the entire sequence of points has been entered. In this manner, a Bezier curve may be defined by a user without requiring the user to specify control points. Control points are automatically defined based on the relative distances between certain points. The techniques described herein allow extrapolation of control points from the relative positions of two adjacent points, and provides stable control points regardless of their positions. These techniques strike a balance between simplicity and mathematical completeness.

As used herein, the phrase "Bezier curve" should not be limited to only those curves defined by the formula set forth in the Background section of this specification. Rather, applicant uses the phrase "Bezier curve" more broadly so as to encompass, for example, a single Bezier curve segment, as well as a series of Bezier curve segments connected end-to-end (sometimes referred to as a Bezier spline).

Figure 1A:
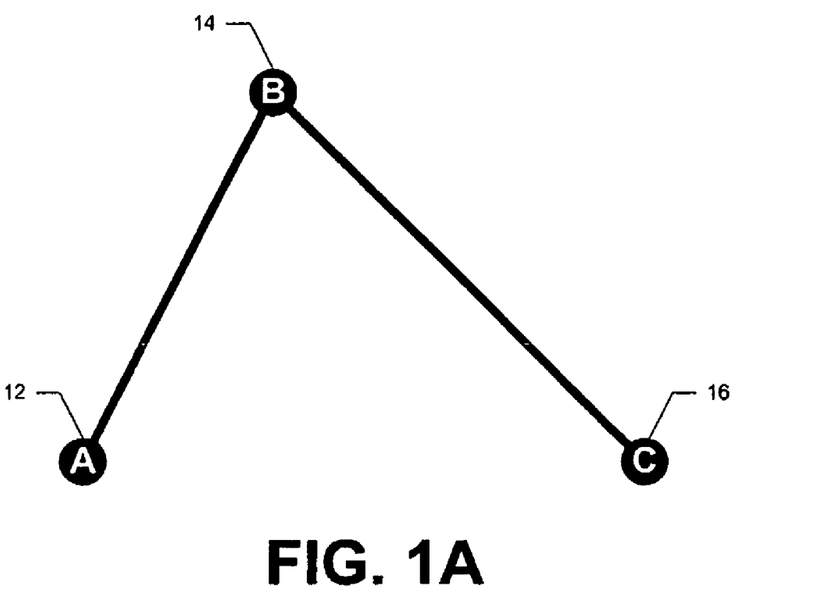
FIG. 1A is a diagram illustrating a sequence of points to be used for the generation of a Bezier curve.

By way of example, a Bezier curve may be created from the three points shown in FIG. 1A: point A 12; point B 14; and point C 16 by generating control points based on the relative position of adjacent points so as to create a series of cubic Bezier segments which are reasonably smoothly connected. By way of example, we describe the generation of control points corresponding to point B 14 as follows.

The control points adjacent to point B 14 may be generated based on the relative positions of point A 12 and point C 16. Cubic Bezier curve segments are defined by two endpoints and two control points that define the tangents at each endpoint. This technique extrapolates the control points at point B 14 which contribute to the two cubic Bezier segments AB and BC through which point B 14 is shared. We will call the two control points along segment AB, $P_{AAB}$ and $P_{ABB}$ and along BC, $P_{BBC}$ and $P_{BCC}$. The control points are extrapolated from the positions of A, B, and C are $P_{ABB}$ and $P_{BBC}$.

The position of the control points depends on the ratio of distance between AB and BC. |AB| and |BC| are the length of the line segment AB and BC. The ratios can be defined as:

$$R_A = |AB|/(|AB|+|BC|)$$

$$R_C = |BC|/(|AB|+|BC|)$$

A, B, and C are treated as positional vectors, and the control points $P_{ABB}$ and $P_{BBC}$ are defined as follows:

$$P_{ABB} = B + R_A*(R_A*(B-C)+R_C*(A-B))$$

$$P_{BBC} = B + R_C*(R_A*(C-B)+R_C*(B-A))$$

Figure 1B:
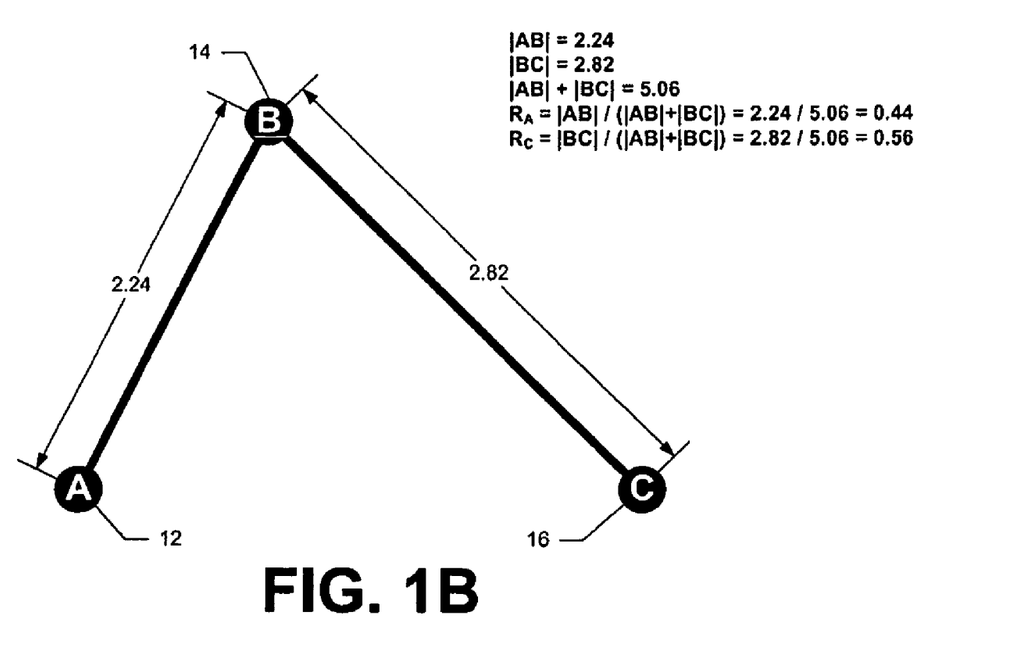
FIG. 1B is a diagram showing the calculation of relative values $R_A$ and $R_C$ based on the relative lengths of segments AB and BC.

Referring to FIG. 1B, the control points corresponding to point B 14 depend on the distances between point B 14 and adjacent endpoints 12 and 16. FIG. 1B shows a distance |AB| as 2.24, and the distance |BC| as 2.82. The sum of the distances |AB|+|BC| is 5.06. Calculating $R_A$ and $R_C$, we find that $$R_A = |AB|/(|AB|+|BC|) = 2.24/5.06 = 0.44; \text{ and}$$

$$R_C = |BC|/(|AB|+|BC|) = 2.82/5.06 = 0.56.$$

Figure 1C:
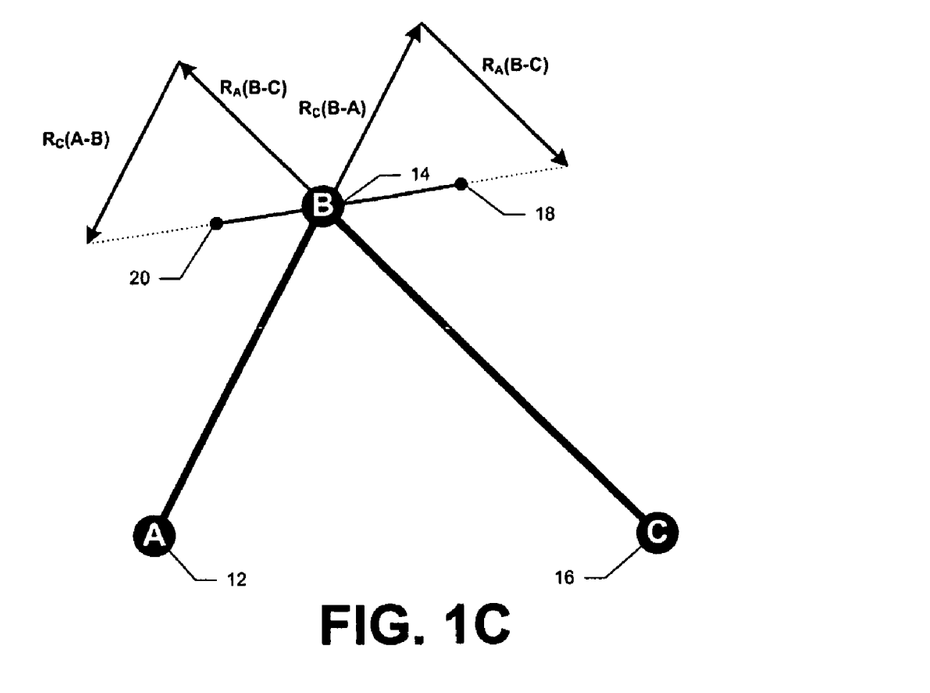
FIG. 1C is a diagram illustrating the calculation of control points corresponding to point B.
Figure 1D:
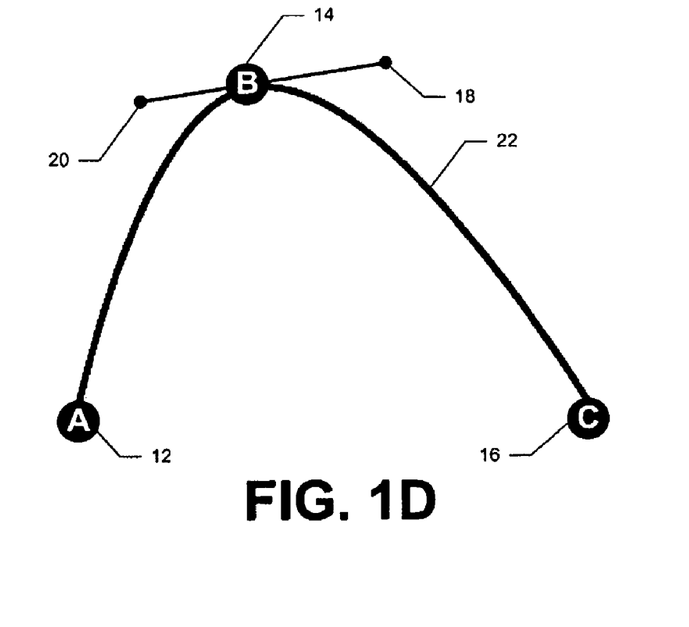
FIG. 1D is a diagram of a Bezier curve showing the location of control points and endpoints.
Figure 1E:
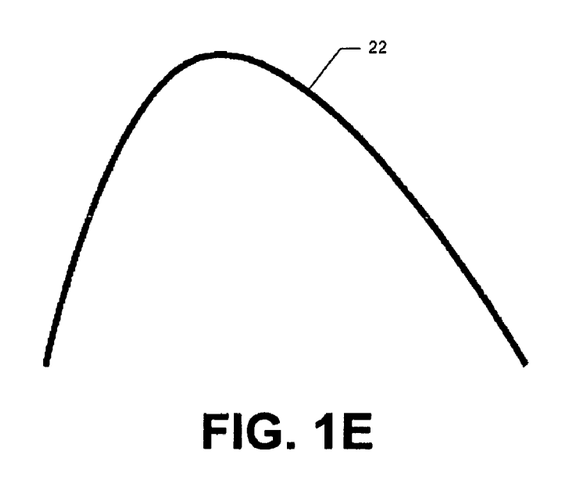
FIG. 1E is a diagram of a Bezier curve having the endpoints and control points as shown in FIG. 1D.

Referring to FIG. 1C, these ratios $R_A$ and $R_C$ are used to calculate the control points $P_{ABB}$ 20 and $P_{BBC}$ 18. Control point $P_{ABB}$ 20 is defined by the positional vector $P_{ABB} = B + R_A*(R_A*(B-C)+R_C*(A-B)) = 0.44(0.44(B-C)+0.56(A-B))$. FIG. 1C shows the addition of vectors $R_C(A-B)$ and $R_A(B-C)$, the result of which is scaled by factor $R_A = 0.44$. Similarly, control point $P_{BBC}$ 18 is defined by the positional vector $P_{BBC} = B + R_C*(R_A*(C-B)+R_C*(B-A))$. FIG. 1C shows the addition of vectors $R_C(B-A)$ and $R_A(C-B)$, the result of which is scaled by factor $R_C = 0.56$. In this manner, the vectors form a smooth tangent at point B 14. The resulting Bezier curve 22 corresponding to control points 20 and 18, and points A 12, B 14, and C 16 is shown in FIG. 1D, and the Bezier curve 22 is shown in FIG. 1E as it would be rendered in a computer graphics application.

By implicitly generating control points from a sequence of endpoints to create a Bezier curve, a user may be provided with an intuitive interface to facilitate, by way of example, the freehand creation of computer graphics. The resulting endpoints and control points can then be manipulated in a conventional manner to refine the Bezier curve as desired by the user. This technique may be applied to each point in the sequence.

The techniques described above may be modified to handle the first and last points in a sequence. For example, the control point associated with the first point and the control point associated with the last point may be set to the points themselves. Furthermore, the techniques described above may be used in a wide variety of computer-implemented systems including, for example, computer-aided design tools, graphics editors, word processors, entertainment software, and the like.

Figure 2:
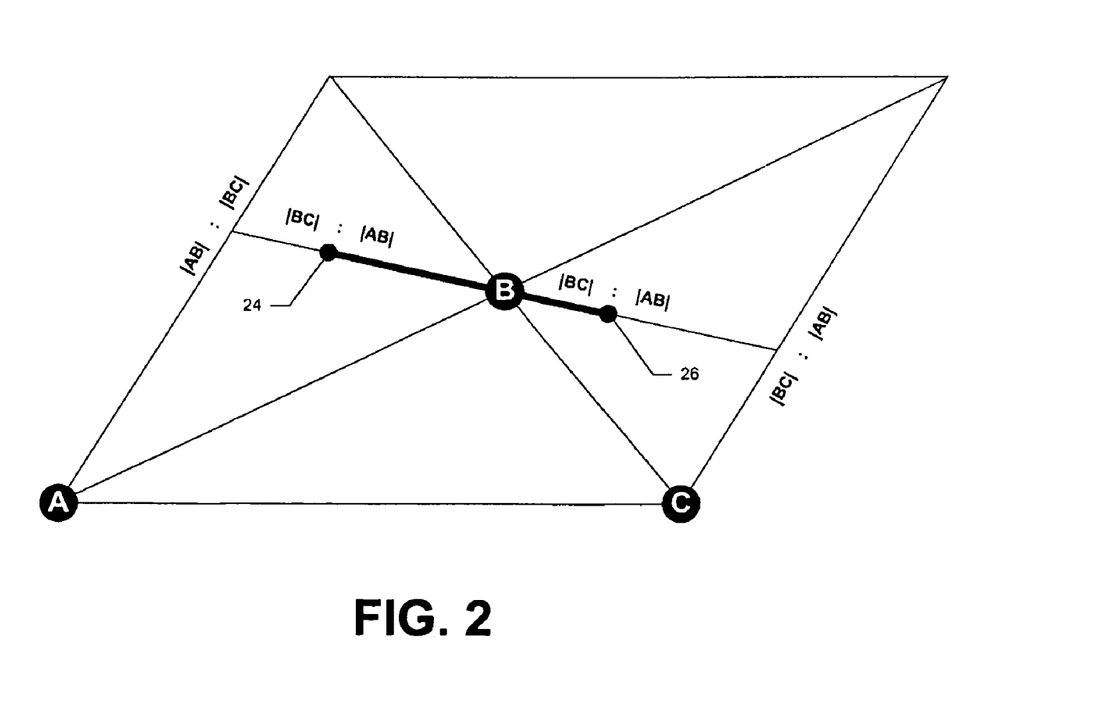
FIG. 2 is a diagram of control points generated according to an embodiment of the present invention.

FIG. 2 illustrates the relative positions of control points 24 and 26 with respect to the relative position of points A and B. For example, control point 24 lies on a line between vectors (B−C) and (A−B). The direction of this line is determined by the ratio |AB|:|BC|, and the position of control point 24 along such line is determined by the same ratio. Similarly, the position of control point 26 is falls along the same such line in the opposite direction with respect to point B. As points 24 and 26 lie along the same line, the tangent at point B is continuous for any ratio |AB|:|BC|.

Figure 3:
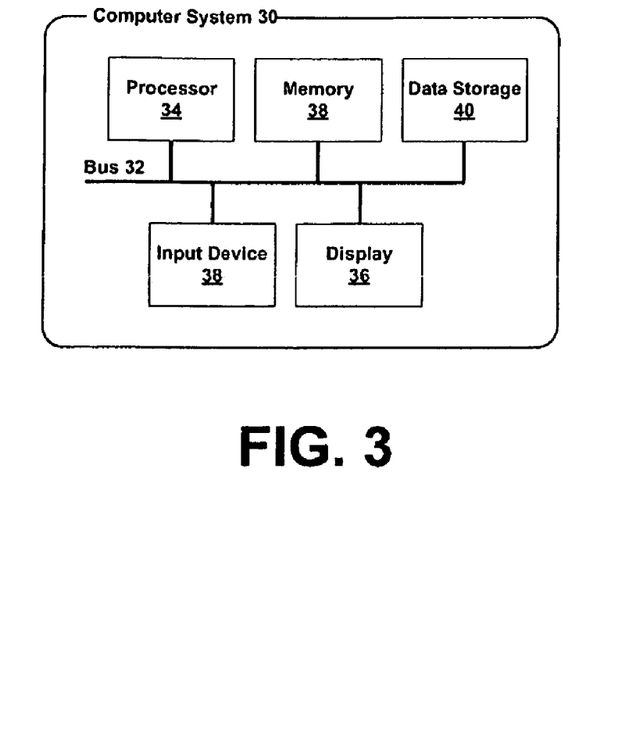
FIG. 3 is a block diagram of a computer system usable to generate Bezier curves from a sequence of points.

Referring to FIG. 3, there is shown a computer system 30 for generating Bezier curves according to the techniques described herein. The computer system 30 includes a bus 32 connecting a processor 34, a memory 38, data storage 40, a display 36, and an input device 38. Generally, this relates to a conventional von Neumann architecture; however, one skilled in the art will appreciate that the techniques described herein are equally applicable to other computer architectures, such as, for example, computer systems having separate data and instruction buses. The computer system 30 includes instructions stored in data storage 40, or on any other computer-readable medium. When executed, these instructions configure the computer system 30 to enable the processor 34 to transform a series of points stored in memory 38 into a Bezier curve and to store the Bezier curve in memory 38. The processor 34 displays the Bezier curve stored in memory 38 by rendering the curve in a conventional manner. Such rendered curve may be viewed using display 36. In a preferred implementation, points are a series and are entered using a mouse, a keyboard, and/or some combination thereof. However, the input device 38 may be embodied as one or more of the following: a keyboard, a mouse, a trackball, a track pad, a gyroscopic pointing device, and the like.

The processor 34 includes any device capable of executing instructions to convert a series of points into a Bezier curve, such as, for example, those processors commonly used in personal computers, laptops, and/or mobile devices. Furthermore, the processor 34 may include multiple cores for simultaneous and parallel execution.

Figure 4:
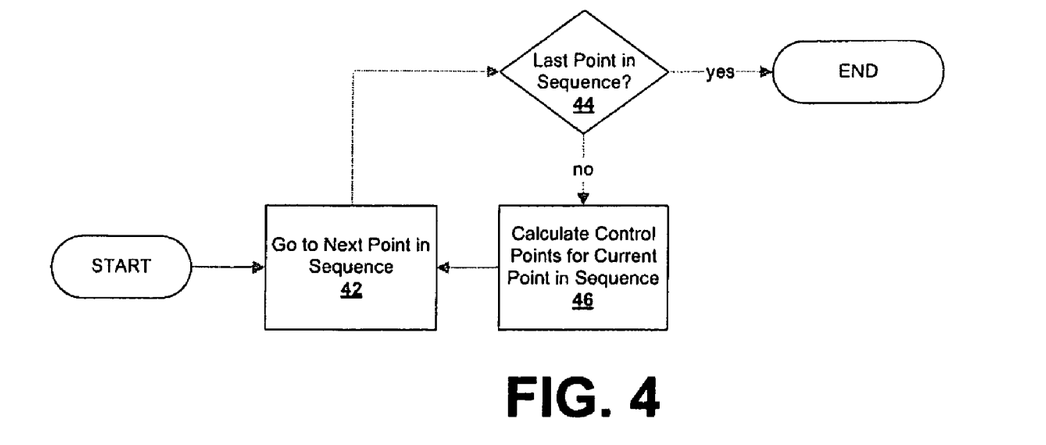
FIG. 4 is a flow chart of a process for generating a Bezier curve from a sequence of points.

Referring to FIG. 4, there is shown a method for generating a Bezier curve from a series of points beginning at the first point in the sequence. This technique uses the relative positions of the point located before and the point located after a current point of interest; however, for the first point, there is no previous point in the sequence. Accordingly, the corresponding control point can either remain undefined or the control point may be set to the same location as the first point. The process continues by moving to the next point sequence (42). In this case, the second point of the sequence.

Assuming that there are more than two points in the sequence (i.e., the second point is not the last point in the sequence), the process iterates through intermediate points in the series, calculating associated control points for each. When the last point in sequence is reached, the process ends (44). As long as points remain, the process continues by calculating control points for the current point in sequence (46). After control points are calculated, the process goes to the next point in the sequence (42), continuing iteratively until the last point in sequence is reached. A control point associated with the last point in sequence may remain undefined, or it may be set to the same location as the first point in sequence.

This process may be performed once all points have been entered, or it may be performed sequentially as points are being entered. For example, the user may click on a first point and a second point. When the user clicks on a third point in sequence, the control points corresponding to the second point may be calculated, and the display updated to show a Bezier curve beginning at the first point, traveling through the second point according to the control points, and ending at the third point. If a fourth point is added, the second point and the fourth point may be used to set the control points corresponding to the third point, and the display may be updated accordingly.

This process may be used to generate a Bezier curve from a series of points, for example, in a computer graphics system. In one implementation, the system enables a user to define a Bezier curve by pointing a cursor to the desired location of a point on the Bezier curve and clicking a mouse button to capture that location. Points are entered consecutively in this manner until the last point is reached. The user indicates that the last point in sequence has been reached such as, for example, by clicking on the last point again, by pressing a button on a keyboard, by clicking a mouse button, or the like.

In another implementation, a user creates a path consisting of a series of points connected to one another in a particular order or sequence. Once a path has been created, the user may select a menu item to convert the path into a Bezier curve. Once a Bezier curve is generated, a user may modify control points and endpoints in a conventional manner.

Figure 5:
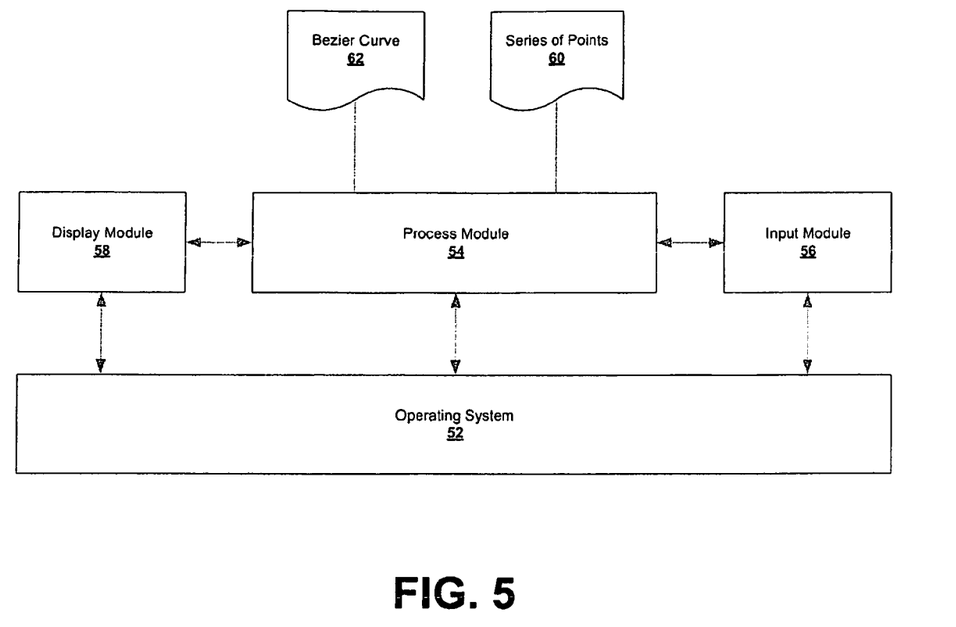
FIG. 5 is a block diagram of a system for generating Bezier curves from a sequence of points.

Referring to FIG. 5, software for converting a series of points into a Bezier curve includes an operating system 52 providing an environment for a process module 54 to interact with various components and peripherals of the system. The process module 54, the input module 56, and the display module 58 each interact with the operating system 52 and each other so as to convert a series of points 60 into a Bezier curve 62. For example, the process module 54 implements a graphical user interface. User input is received by the operating system 52 and processed by the input module 56 to identify points in a sequence. For example, when a user moves a mouse, the operating system 52 processes the movement and displays a pointer on the display. When a user clicks a button on the mouse, or other input device so as to indicate a point to be added to a series, the input module 56 receives and processes the input, and the process module 54 updates data structures appropriately.

Points in a series 60 are stored on a computer-readable medium, such as, for example, random-access memory, a hard drive, flash memory, or the like. The memory can be located either locally or remotely to the system. The process module 54 retrieves the series of points 60 and calculates control points for a Bezier curve in the manner set forth above. The resulting control points are stored together with endpoints defining Bezier curve 62.

Figure 6:
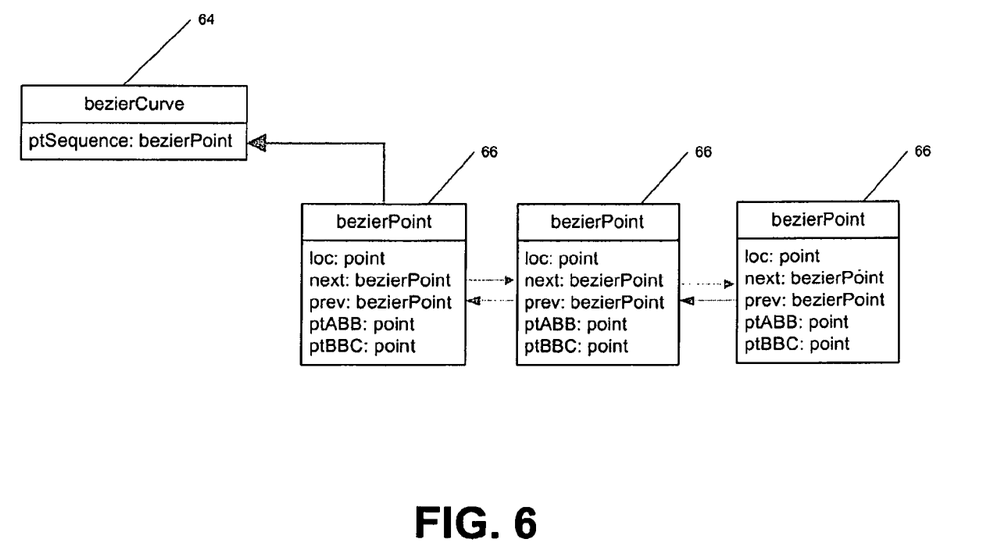
FIG. 6 is a diagram of a data structure for storing Bezier curves on a computer-readable medium.

The Bezier curve 62 may be stored as a data structure, such as that set forth in FIG. 6. The Bezier Curve data structure 64 includes a data element called ptSequence of type Bezier Point 66 which identifies the first point in a sequence of points. Data type Bezier Point 66 includes data elements as follows: (i) "loc" of type point to indicate the coordinates of the Bezier endpoint; (ii) "next" and "prev" of type bezierPoint to indicate the next Bezier point in sequence and the previous Bezier point in sequence, respectively; and (iii) control points "ptABB" and "ptBBC" of type Point to identify the coordinates of control points. Data element ptABB is the control point at B corresponding to segment AB, and data element ptBBC is the control point at B corresponding to segment BC. The bezierCurve data structure 64 may be generated by process logic in the course of calculating control points in the manner discussed above.

Figure 7A:
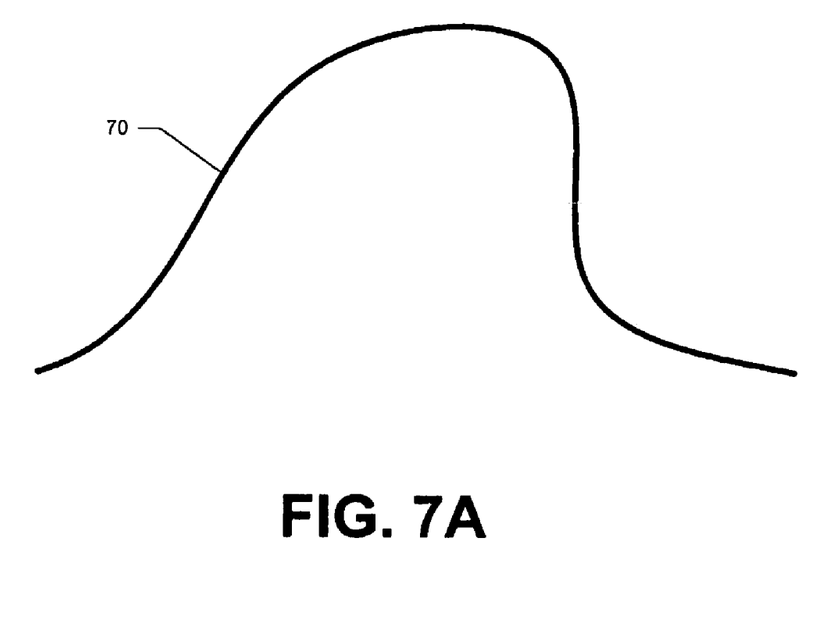
FIG. 7A is a diagram showing an exemplary path for conversion to a Bezier curve.

Examples above describe how to convert series of points into Bezier curves; however, it is also possible to represent or approximate any given path as a Bezier curve. For example, FIG. 7A shows an exemplary path 70 to be converted into a Bezier curve. The path 70 can be generated using an input device, such as, for example, a touch screen, a pen tablet, a mouse, a track ball, a motion sensor, a gyroscopic controller, and the like.

Figure 7B:
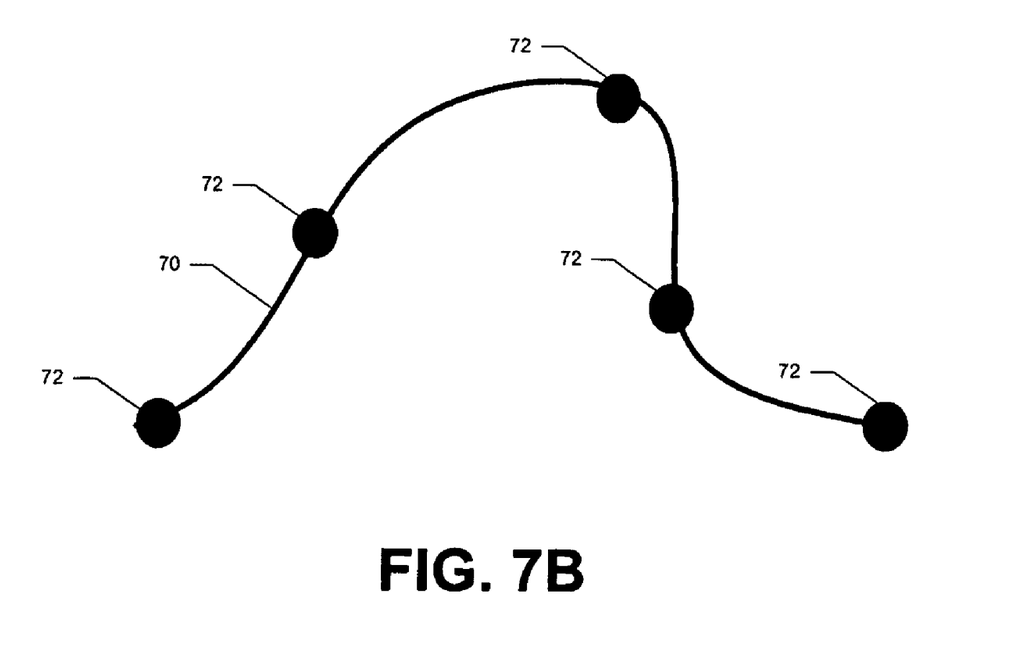
FIG. 7B is a diagram showing the location of control points along the path shown in FIG. 7A.

As shown in FIG. 7B, the path 70 is sampled at various points 72. These points are 72 are then used to generate a Bezier curve in the manner discussed above with respect to FIGS. 1A-1E. Points 72 can be selected using at least three different approaches: (1) a time-based interval; (2) a distance-based interval; or (3) a feature-based interval. Using a time-based interval, path 70 is sampled as it is received (e.g., from an input device). Periodically (e.g., every N seconds), a point 72 along the path 70 is identified. The resulting points 72 are then used to create a Bezier curve. Using a distance-based interval, points 72 are selected at a regular distance interval along the path 70. For example, points 72 may be identified every N inches (or any other measure of distance) along the path 70. Similarly, the resulting points 72 are then used to create a Bezier curve.

Using a feature-based approach, points 72 are identified more frequently at or near identified features of the path 70. One skilled in the art will understand various techniques for identifying features of the path 70. For example, points along path 70 may be identified periodically, such as by using a predetermined time interval or distance interval. Then, the vector from one identified point to the next is determined. Successive vectors can be compared and used to identify a feature. The more successive vectors differ, the more useful additional points 72 may be. Points 72 are identified such that a greater frequency of points 72 along features of the path 70. Conversely, the more regular a path 70 is, fewer points are needed to represent it.

Regardless of the manner used to define points 72, a Bezier curve may be created from those points 72 in the manner set forth above with respect to FIGS. 1A-1E. The resulting Bezier curve provides a compact representation of the original path 70. Instead of representing a path 70 as a series of hundreds, thousands, or even more points, the path 70 may be represented as a compact series of points 72 defining a Bezier curve, resulting in significant data compression. Furthermore, in this manner, a Bezier curve can be represented as a series of points 72 without associated control points, as control points may be generated, when desired, using the technique described above with respect to FIGS. 1A-1E. For example, in one implementation, a Bezier curve is stored as a series of points without explicit representation of corresponding control points. Control points are determined when such a curve is rendered for display (or as otherwise desirable). So long as control points are not modified, it is not necessary to explicitly represent them, resulting in a compressed representation.

A number of implementations have been described. Nevertheless, it will be understood that various modifications may be made without departing from the spirit and scope of the invention. Accordingly, other implementations are within the scope of the following claims.

What is claimed is:

1. A system for interactive computer graphics that enables generation of Bezier curves from a series of points, the system comprising:
    means for data logic processing;
    input means for receiving user input; and
    a computer-readable medium,
    wherein a series of points is received by the input means for receiving user input and is transferred to the computer-readable medium for processing by the means for data logic processing, and the means for data logic processing retrieves points of the series of points from the computer-readable medium and calculates control points corresponding to one or more points according to the relative distance between successive points of the series of points, and the means for data processing generates a Bezier curve using the calculated control points and the series of points, and the generated Bezier curve is stored in the computer-readable medium, and
    wherein point A, point B, and point C are successive points in the series of points, and wherein a control point corresponding to point B and associated with the segment AB is determined by the equation $B+R_A*(R_A*(B-C)+R_C*(A-B))$, and a control point corresponding to point B and associated with the segment BC is determined by the equation $B+R_C*(R_A*(C-B)+R_C*(B-A))$, where $R_A=|AB|/(|AB|+|BC|)$, and $R_C=|BC|/(|AB|+|BC|)$.

2. A non-transitory computer-readable medium having computer instructions stored thereon, the computer instructions executable by a computer system to carry out a method for generating a Bezier curve from a series of points, the method comprising:
    retrieving points A, B, and C from a computer-readable medium, the points A, B, and C being successive points in a series of points identified by a user of the computer system using a computer input device;
    in a processor of the computer system, calculating control points from the retrieved points A, B, and C, the control points determined by the relative positions of the retrieved points A, B, and C;
    generating a Bezier curve data structure that includes the points A, B, and C, and the calculated control points;
    storing the generated Bezier curve data structure on a computer-readable medium; and
    enabling a user to manipulate the generated Bezier curve using a graphical user interface, wherein a control point corresponding to point B and associated with the segment AB is determined by the equation $B+R_A*(R_A*(B-C)+R_C*(A-B))$, and a control point corresponding to point B and associated with the segment BC is determined by the equation $B+R_C*(R_A*(C-B)+R_C*(B-A))$, where $R_A=|AB|/(|AB|+|BC|)$, and $R_C=|BC|/(|AB|+|BC|)$.

3. In a graphical user interface of an interactive computer graphics system, a method for defining Bezier curves, the method comprising:
    receiving a first point A identified by a user through the graphical user interface of the interactive computer graphics system;
    receiving a second point B identified by a user through the graphical user interface of the interactive computer graphics system;
    receiving a third point C identified by a user through the graphical user interface of the interactive computer graphics system;
    calculating a control point corresponding to point B and associated with the segment AB is determined by the equation $B+R_A*(R_A*(B-C)+R_C*(A-B))$, wherein $R_A=|AB|/(|AB|+|BC|)$, and $R_C=|BC|/(|AB|+|BC|)$;
    calculating a control point corresponding to point B and associated with the segment BC is determined by the equation $B+R_C*(R_A*(C-B)+R_C*(B-A))$;
    generating a Bezier curve data structure storing point A, point B, and point C, and storing, associated with point B, the first control point and the second control point associated with point B, the Bezier curve data structure being used to render a Bezier curve for display on a display of the computer graphics system and manipulation by a user.

* * * * *